United States Patent [19]

New et al.

[11] Patent Number: 4,748,582

[45] Date of Patent: May 31, 1988

[54] PARALLEL MULTIPLIER ARRAY WITH FORESHORTENED SIGN EXTENSION

[75] Inventors: Bernard J. New, Los Gatos; Timothy J. Flaherty, Santa Clara, both of Calif.

[73] Assignee: Advanced Micro Devices, Inc., Sunnyvale, Calif.

[21] Appl. No.: 747,073

[22] Filed: Jun. 19, 1985

[51] Int. Cl.⁴ .............................................. G06F 7/52
[52] U.S. Cl. ..................................... 364/754; 364/757
[58] Field of Search ................................ 364/754–760

[56] References Cited

U.S. PATENT DOCUMENTS

| | | | |
|---|---|---|---|
| 3,878,985 | 4/1975 | Ghest et al. | 364/759 |
| 4,546,446 | 10/1985 | Machida | 364/757 |
| 4,644,488 | 2/1987 | Nathan | 364/757 |

OTHER PUBLICATIONS

S. Bandyopadhyay et al., "An Iterative Array for Multiplication of Signed Binary Numbers", IEEE Trans. on Computers, Aug. 1972, pp. 921–922.

Primary Examiner—Gary V. Harkcom
Assistant Examiner—Long Thanh Nguyen
Attorney, Agent, or Firm—Patrick T. King; Kenneth B. Salomon; J. Vincent Tortolano

[57] ABSTRACT

A compact rectangular parallel multiplier array of Booth summation cells includes along a left edge a cell which reduces to two the number of sign-extension bits sufficient to generate subsequent intermediate products. The cell employs optimized logic circuitry which generates a sum, a carry and a guard bit for use during generation of the next most-significant intermediate product.

12 Claims, 3 Drawing Sheets

PARALLEL MULTIPLIER ARRAY WITH FORESHORTENED SIGN EXTENSION

CROSS-REFERENCE TO CO-PENDING APPLICATION

Related, co-pending application of particular interest to the present invention is U.S. Patent Application Ser. No. 747,079, filed June 14, 1985 on behalf of Bernard J. New and Timothy J. Flaherty entitled "High Throughput Extended-Precision Multiplier", which description is incorporated herein.

FIELD OF THE INVENTION

This invention relates to digital electronic multiplier circuits, and more particularly, to a parallel multiplier array capable of forming the product of two two's complement thirty-two bit operands which retains only two sign-extension bits.

BACKGROUND OF THE INVENTION

Multiplication of numbers represented in binary notation (powers of 2) is a common operation in digital circuits. Known in the art are a variety of techniques to perform multiplication. Some of these techniques employ a minimal amount of circuitry and consume relatively large amounts of time, while others operate quickly but require relatively extensive circuitry. A tradeoff between speed and circuit complexity is therefore mandated in the design of any electronic multiplier.

One approach commonly employed to speed up the operation of digital multiplier circuits is attributed to Booth and has the virtue of working properly on positive and negative, fractional and integer numbers represented in two's complement notation. A particular variant of Booth's method operates on two adjacent bit positions of the multiplier at every generation of an intermediate product. This variant provides a two-fold improvement in speed; first from the multiple shifts preceding generation of the intermediate product, and second from the two-bit look-ahead.

Circuitry which implements the Booth variant is known in the art but is, as mentioned, generally quite complex. While it is recognized in the art that certain of the least-significant bits of the intermediate products do not change after a certain point in the multiplication, and therefore, the resulting circuitry which implements the portion of the multiplier generating the least-significant bits of the product can be simplified, no equivalent savings are made in the portion implementing the most-significant bits of the product. This is due to the requirement to retain all of the most-significant bits of the intermediate product for subsequent inclusion in the sums forming later intermediate products.

Accordingly, there is a need for a multiplier having a circuit array which provides enough storage for each intermediate product without the redundant storage of bit positions for those most-significant bits which simply contain extraneous sign-extension information.

SUMMARY OF THE INVENTION

A parallel multiplier array consisting of an array of Booth summation (B) cells arranged in rows of thirty-two, each producing one bit of an intermediate sum and carry, and a foreshortened sign-extension (F) cell, each producing two sign-extension bits is provided by the instant invention. The array comprises sixteen rows, the B and F cells in the ith row receiving control signals generated by a cell encoding information from bit positions $(2*i)-1$, $2*i$ and $(2*i)+1$ of the multiplier word. In this manner, each row of B cells can form an intermediate sum and carry based on zero times, one times, or two times the multiplicand or the two's complement of the multiplicand word. The complete product of the multiplicand and multiplier words is formed from the intermediate sums and carries in an accumulator external to the multiplier array.

The multiplier array of the present invention performs operations on 32-bit multiplicand and 32-bit multiplier words which may represent fractional or integer values in two's complement notation or in unsigned fractional or integer notation. A sixty-four bit product word is generated by the multiplier array of the instant invention.

The F cell utilized in the multiplier array requires that only two bits of the sign be extended, a sign bit and a "guard" bit. In this way the row size of the array is held to a minimum of thirty-four bits and yet provides for parallel generation of the full sixty-four bit product of signed two's complement thirty-two bit operands. The F-cell of the instant invention consists of two arithmetic units receiving the sign signal generated by the F cell of the preceding row of the array, and the two most-significant bit positions of the multiplicand.

Multiplexers in the B and F cells select a left-shifted bit, an unshifted bit of the multiplicand, or a ZERO bit to combine with the sum and carry bits generated during the preceding intermediate sum and carry so as to implement a two-bit-at-a-time Booth multiplication scheme. This scheme generates products of operands represented in two's complement notation. A special add/subtract insertion bit generated by the Booth encoding cell is transmitted to every other B cell in the first row of the array to provide appropriate signals, binary ZERO for addition, binary ONE for subtraction, to implement the two-bit-at-a-time Booth scheme.

DETAILED DESCRIPTION OF PREFERRED EMBODIMENT

Figure 1:
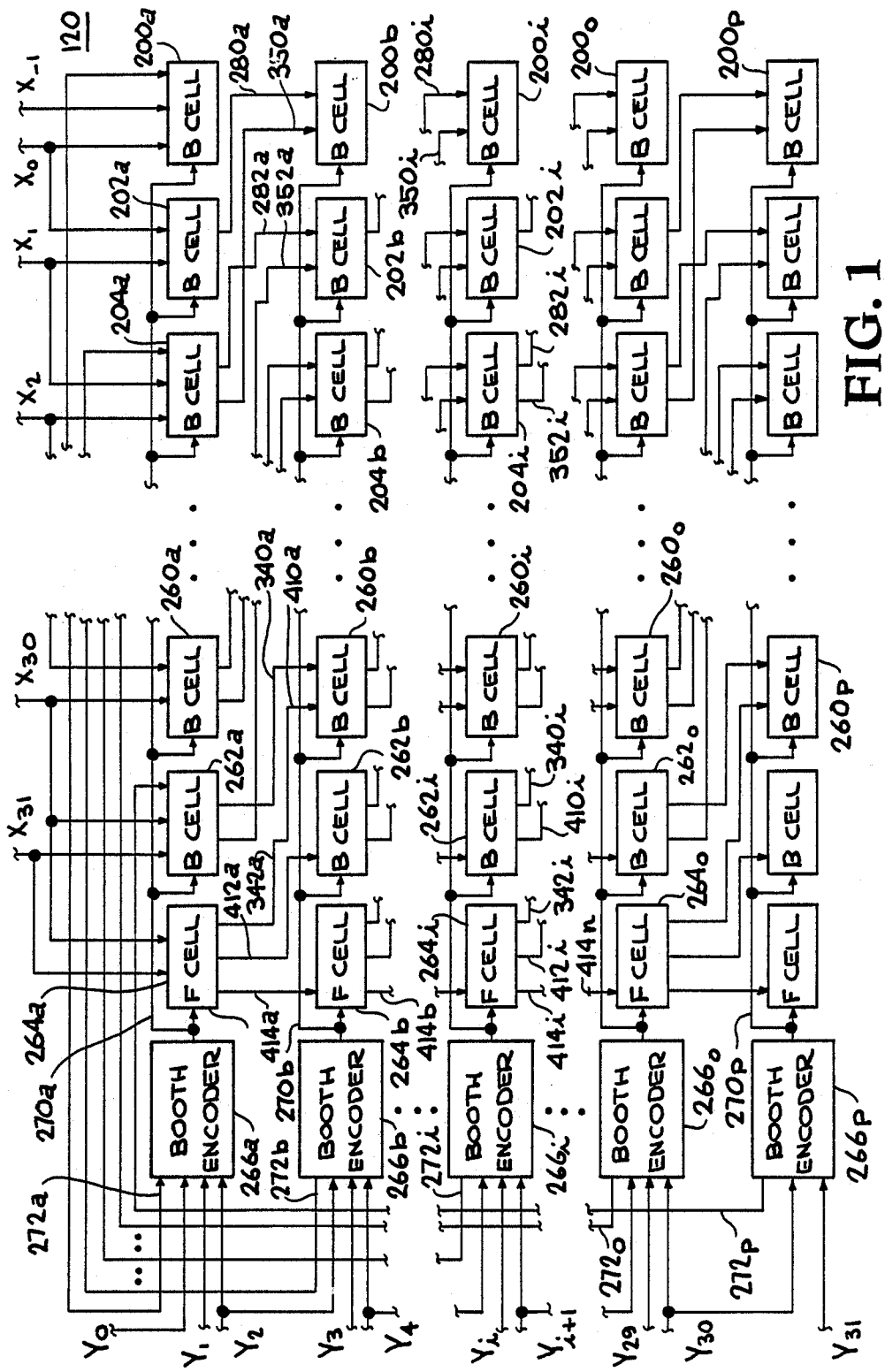
FIG. 1 is a block diagram of the multiplier array of the instant invention.

A multiplier array 120 capable of generating the 64-bit product of a 32-bit multiplicand and a 32-bit multiplier is illustrated in FIG. 1 in block diagram form. The multiplier array 120 is suitable for use in an extended-precision multiplier circuit such as that identified as a "32-×32-bit multiplier array" and described in the related, co-pending application entitled "High Throughput Extended-Precision Multiplier", U.S. Ser. No. 747,079, filed June 19, 1985 on behalf of Bernard J. New and Timothy J. Flaherty and assigned to the assignee of the instant application, which description is incorporated herein. However, the instant invention is described in connection with such a multiplier for purposes of illustration only.

A set of thirty-two conductors carry to the multiplier array 120 the thirty-two true bits of the multiplier word X0-31 and the multiplicand word Y0-31, and the thirty-two complemented bits of the multiplier word $\overline{X0\text{-}31}$ and the thirty-two complemented bits of the multiplicand word $\overline{Y0\text{-}31}$. A set of sixty-four conductors carry away from the multiplier array 120 signals corresponding to the product word P0-63 representing the product of the 32-bit multiplicand word and the 32-bit multiplier word. The multiplicand and multiplier may be represented in fractional or integer two's complement notation, or unsigned fractional or integer notation.

With reference to FIG. 1, multiplier 120 is an array of sixteen rows, each row, i, consisting of thirty-two Booth sum (B) cells $200i$, $202i$, $204i$, ..., $260i$, $262i$, a foreshortened sign extension (F) cell $264i$, and a Booth encoder cell $266i$. Each B cell $200a$, $202a$, ..., $260a$ and $262a$, and the F cell $264a$ in the first row of multiplier array 120 is shown receiving signals X0 and X−1, X1 and X0, ..., X30 and X29, and X31 and X30, and X31 and X30 respectively, corresponding to the bit positions 0 and −1, 1 and 0, ..., 30 and 29, and 31 and 30, and 31 and 30 of the multiplicand operand. By convention, X−1 corresponds to binary ZERO. While only the B and F cells in the first row are shown in FIG. 1 as receiving the Xj and Xj−1 signals, all B cells in each column and all F cells receive the signals Xj and Xj−1 shown received by the B and F cell in the first row of that column. The remaining interconnections, not shown, are omitted from FIG. 1 in the interest of clarity. In addition, the particular signal Xj received by a cell may correspond to either the true or the complemented value of the corresponding bit position of the multiplicand word. The value received by a particular cell will be described in connection with the detailed description of the cell, below.

Each row of the multiplier array 120 contains a Booth encoder cell $266a$, $266b$, ..., $266o$, and $266p$, which receives the signals Y0, Y1, and Y2; Y2, Y3 and Y4; ...; Y28, Y29 and Y30; and Y30 and Y31; respectively, corresponding to the bit positions 0, 1 and 2, 2, 3 and 4; ...; 28, 29 and 30; and 30 and 31, respectively, of the multiplier operand. As with the Xj signals, the particular signal Yi received by a cell may correspond to either the true or the complemented value of the corresponding bit position of the multiplier word. The value received will be described in connection with the detailed description of the Booth encoder cell, below.

Each Booth encoder cell, $266i$, generates on a set of 4-conductor signal lines $270i$, a set of four control signals corresponding to one of the operations No_Op, single add/subtract, or double add/subtract, which will be described below in connection with Table I. Each F and B cell within the ith row of multiplier array 120 receives these four signals generated by the Booth encoder cell, $266i$, in that row via signal lines $270i$. (For convenient notation, in the drawings there are many control or data paths near which there are numbers enclosed by parentheses. These enclosed numbers indicate the width of the adjacent control or data path, or the number of signals which can be transferred in parallel on the control or data path. The multiplier array 120 requires timing and control signals from a clock and a control block which while not shown in FIG. 1, nor is their design and operation described in detail herein, are well-known to those skilled in the art.)

As shown in FIG. 1, each Booth encoder $266a$, $266b$, ..., $266p$, also generates on a signal line $272a$, $272b$, ..., $272p$, respectively, an add/subtract control signal which is shown received by the B cell $200a$, $204a$, ..., $264a$, respectively.

The B cell in the (i+1)st row and jth column of the multiplier array 120 receives from the B cell in the (j+1)st column of the preceding ith row a carry-in signal on a signal line $280i$, $282i$, ..., $338i$ and $340i$, and from the B cell in the (j+2)nd column of the preceding ith row a sum signal on a signal line $350i$, $352i$, ..., $410i$.

The B cell in the 31st column of the multiplier array 120 receives from the F cell in the preceding ith row a carry-in signal on a signal line $342i$ and the B cell in the 32nd column receives from this F cell a sum signal on a signal line $412i$. In addition, each F cell in the (i+1)st row of the multiplier array 120 receives from the F cell in the preceding ith row a SIGN signal on a signal line $414i$.

Sixteen intermediate products are formed during the multiplication of the 32-bit multiplicand and multiplier operands. The ith intermediate product is the product of the multiplicand word X31, ..., X0 and the multiplier word Y31, ..., Y0 left-shifted 2*i bit positions. The complete 64-bit product of the multiplicand word and the multiplier word is the sum of the sixteen intermediate products. The contents of the B cells $200i$, $202i$, ..., $260i$ of the (i+1)st row of the multiplier array 120 represents the 32 most-significant bits of the ith intermediate product. As such, it can be viewed as the results of a right shift of 2*(i−1)bit positions of the intermediate sum. To form this sum, a set of fourteen intermediate sums and carries are generated. The sum and carry generated on the signal lines $350i$, $352i$, ..., $412i$, and the signal lines $280i$, $282i$, ..., $340i$, respectively, represents the fourteen intermediate sums and carries, $2 < = i = < 15$. The contents of the F cell $262i$ of the (i+1)st row of the multiplier array 120 represents the sign extension bits of the ith intermediate product, and the sign signal generated on signal line $414i$ represents the sign of the intermediate product.

The multiplier array 120 employs Booth's method to form the intermediate products in accordance with Table I, below, in which two adjacent bit positions of the multiplier are utilized.

TABLE I

| Booth's Two-Bits-at-a-Time Variant | | | |
|---|---|---|---|
| Contents of Multiplier Positions | | | |
| $Y_{i+1}$ | $Y_i$ | $Y_{i-1}$ | Operation |
| 0 | 0 | 0 | No_Op (0X) |
| 0 | 0 | 1 | Add Once (1X) |
| 0 | 1 | 0 | Add Once (1X) |
| 0 | 1 | 1 | Add Twice (2X) |
| 1 | 0 | 0 | Subtract Twice (−2X) |
| 1 | 0 | 1 | Subtract Once (−1X) |
| 1 | 1 | 0 | Subtract Once (−1X) |
| 1 | 1 | 1 | No_Op (0X) |

The operations called for in Table I for each combination of adjacent multiplier bit values refer to whether 0X, 1X, or 2X of the multiplicand X is to be added to, or subtracted from, the present intermediate product. A detailed description of the theory underlying the entries in Table I can be found in Chapter 5 entitled "Digital Signal Processing Handbook", of *Schottky and Low-Power Schottky Data Book*, edited by John R. Mick, Second Edition, copyright 1976 by Advanced Micro Devices, Inc., 901 Thompson Place, Sunnyvale, Calif. 94086, which description is incorporated herein.

The complete 64-bit product is formed in a pair of registers external to the multiplier array 120, which are not shown in FIG. 1, nor is their design or operation described in detail herein, being well-known to those skilled in the art. Of importance to an understanding of the present invention is only that these registers receive the sums and carries formed within the B and F cells within the ith row of the array 120, left-shifted 2*(i−1) bit positions. In this manner, the registers perform an accumulation of the ith intermediate product formed in these B and F cells appropriately scaled to account for the two-bit-at-a-time operations called for by Table I, above.

Figure 2:
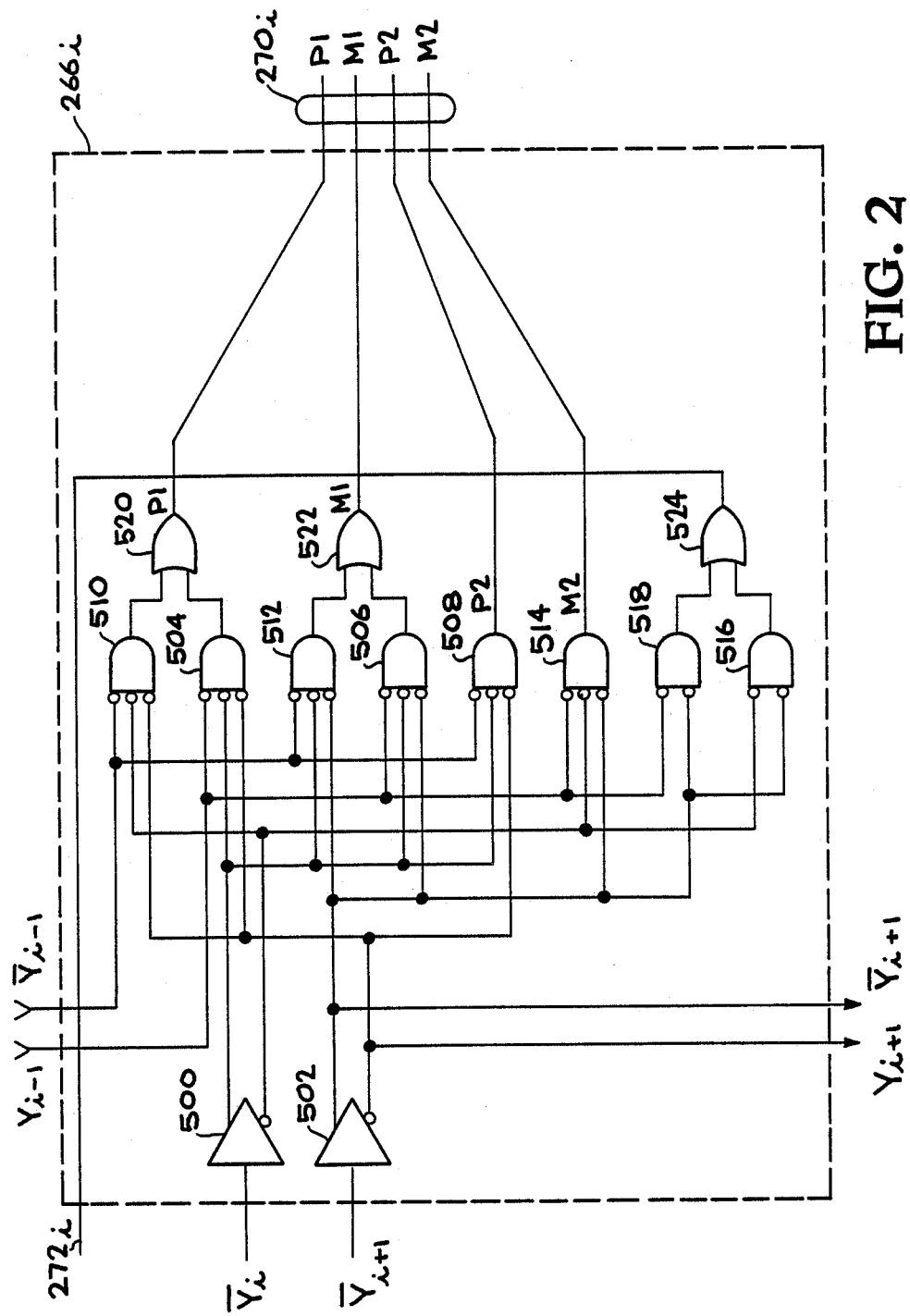
FIG. 2 is a logic diagram of the Booth Encoder used in the multiplier array.

FIG. 2 is a logic diagram of a representative Booth Encoder shown in block form in FIG. 1, and labelled thereon 266i. Appropriate modifications are required to the circuit shown in FIG. 2 for the Encoders 266a in the first and last rows in the multiplier array 120 and 266p, as will be appreciated by those skilled in the art. As shown, a pair of inverting amplifiers 500 and 502 receive the signals $\overline{Yi}$ and $\overline{Yi+1}$, respectively, representing the complement of the i and (i+1)st bit positions of teh multiplier operand. Signals Yi−1 and $\overline{Yi-1}$ are received from the Booth Encoder 266(i−1) inthe preceding row (i−1). Similarly, Booth Encoder 266i generates at a true and a complemented output of amplifier 502 the signals Yi+1 and $\overline{Yi+1}$, respectively, which are then conducted to the Booth Encoder 266(i+1) in the next row (i+1). As mentioned above, by convention Y−1 corresponds to a binary ZERO, and the Booth Encoder 266p receives only the Y30 and Y31 signals. In this manner, the contents of the three multiplier positions shown in Table I are available to generate the appropriate operation called for in Table I on the signal lines 270i; namely, No_Op (P1, P2, M1 and M2 all LOW), Add Once (P1 HIGH), Add Twice (P2 HIGH), Subtract Once (M1 HIGH) and Subtract Twice (M2 HIGH). Also, the Booth Encoder 266i generates the add/subtract control signal on signal line 272i in which a HIGH signal is inserted during a subtract operation and a LOW signal inserted during an add operation.

The true output of amplifier 500 is connected to a complemented input of an AND gate 504, an AND gate 506 and an AND gate 508. The complemented output of amplifier 500 is connected to a complemented input of an AND gate 510, an AND gate 512, and AND gate 514 and an AND gate 516. The true output of amplifier 502 is connected to a second complemented input of AND gate 512, AND gate 506, AND gate 514 and a second complemented input of AND gate 518. The complemented output of amplifier 502 is connected to a second complemented input of AND gate 510, AND gate 504, and AND gate 508. The $\overline{Yi-1}$ signal is received at a third complemented input of AND gate 510, AND gate 512, and AND gate 508, while the Yi−1 signal is received at a third complemented input of AND gate 504, AND gate 506, AND gate 514 and a second complemented input of AND gate 518.

An OR gate 520 receives the outputs of AND gates 510 and 504 and generates at an output the P1 signal which is conducted on one of the signal lines 270i. An OR gate 522 receives the outputs of AND gates 512 and 506 and generates at an output the M1 signal which is conducted on a second one of the signal lines 270i. The AND gate 508 generates at an output the P2 signal which is conducted on a third one of the signal lines 270i, and the AND gate 514 generates at an output the M2 signal which is conducted on a fourth one of the signal lines 270i. An OR gate 524 receives teh outputs of AND gates 518 and 516 and generates at an output the add/subtract insertion signal which is conducted on the signal line 272i.

Figure 3:
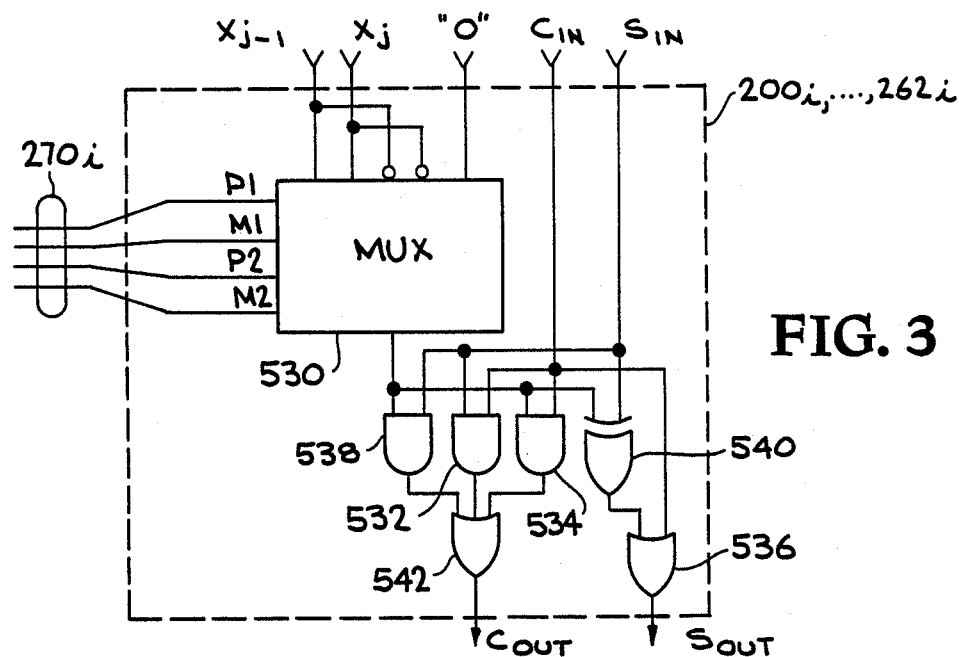
FIG. 3 is a logic diagram of the Booth sum (B) cell used in the multiplier array.

FIG. 3 is a logic diagram of a representative one of the B cells 200i, . . . , 262i, located in the ith row of the array 120 shown in FIG. 1. As shown, a multiplexer 530 receives on signal lines 270i the P1, M1, P2 and M2 signals generated by the Booth Encoder 266i in the same row, i, of array 120. These signals are used to select which of the data signals, Xj, Xj−1, or binary ZERO, received by the multiplexer 530 will be transmitted to an output of multiplexer 530, in accordance with the contents of the multiplier bit positions Yi+1, Yi and Yi−1, corresponding to the ith row of array 120, as specified in Table I, above.

A sum-in (S—IN) signal generated by the B cell in the preceding row via one of the signal lines 350i, . . . , 412i is received by the B cell 200i, . . . , 262i, respectively. In the case of the B cells 200a, 202a, . . . , 260a, 262a, in the first row of array 120, the S—IN signal is the add/subtract insertion bit signal generated by the Booth Encoder 266a, 266b, . . . , 266p, respectively, conducted therefrom via signal line 272a, 272b, . . . , 272p, respectively.

The carry in (C_IN) signal generated by the B cell in the preceding row is conducted via one of the signal lines 280i, 282i, . . . , 340i to the illustrated B cell. An input of an AND gate 532, an AND gate 534 and an EXOR gate 536 receive the C—IN signal. The signal generated at the output of the multiplexer 530 is received at an input to the AND gate 534, an AND gate 538 and an EXOR gate 540. The S—In signal is received at a second input to AND gate 538, AND gate 532 and EXOR gate 540. An OR gate 542 receives the signals generated at the outputs of AND gates 532, 534 and 538 and generates therefrom a carry out (C OUT) signal on one of the signal lines 280i, . . . , 342i. The EXOR gate 536 receives at a second input the signal generated at the output of EXOR gate 540 and generates a sum out (S—OUT) signal on one of the signal lines 350i, . . . , 414i. The S—OUT and C—OUT signals so generated represent the binary sum and carry out corresponding to the bit position within the ith intermediate sum and carry of the illustrated B cell within the ith row.

Figure 4:
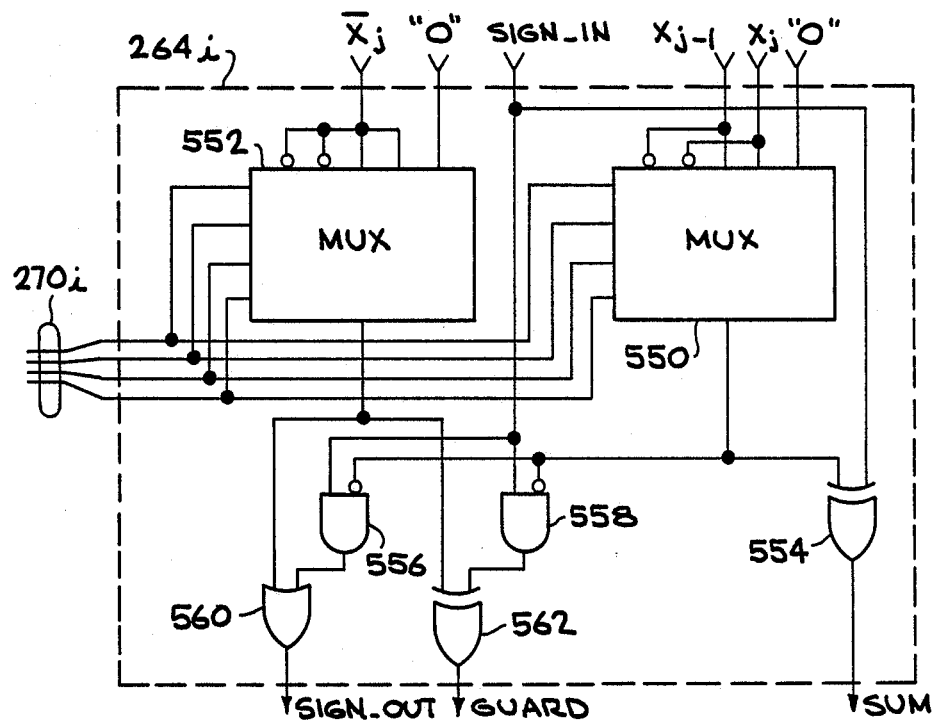
FIG. 4 is a logic diagram of the foreshortened sign-extension (F) cell used in the multiplier array.

FIG. 4 is a logic diagaram of a representative F cell 264i , of the multiplier array 120 shown in FIG. 1. As shown, a multiplexer receives on signal lines 270i the P1, M1, P2 and M2 signals generated by the Booth Encoder 266i in the same row, i, of array 120. These signals are used to select which of the sign extended data signals, Xj, Xj−1, received on signal lines 418i and 416i, respectively, or binary ZERO, received by the multiplexer 550 will be transmitted to an output of the multiplexer 550, as was described above in connection with the multiplexer 530 contained within the B cell shown in FIG. 3. A second multiplexer 552 also receives the P1, M1, P2 and M2 signals and uses them to select whether the Xj or Xj, or binary ZERO signal received by te multiplexer 552 will be transmitted to an output of the multiplexer 552.

A sign-in (SIGN_IN) signal generated by the F cell 264 (i−1) in the preceding row (i−1) is received via the signal line 414(i−1). This SIGN_IN signal is received at an input to an EXOR gate 554, an input to and AND gate 556 and an input to an AND gate 558. The signal generated at the output of the multiplexer 550 is received at a second input to the EXOR gate 554, and a complemented inputs to the AND gates 556 and 558. The signal generated at the output of the multiplexer 552 is received at an input to an OR gate 560 and an input to an EXOR gate 562. The EXOR gate 554 generates therefrom a SUM_OUT signal. The EXOR gate 562 receives at a second input the signal generated at the output of AND gate 558 generates at an output a GUARD signal. The OR gate 560 receives at a second input the signal generated at the output of the AND gate 556 and generates at an output a SIGN_OUT signal. The SIGN_OUT signal so generated is conducted via signal line 414$i$ to the F cell 264($i$+1), in the next row of array 120.

The array 120 of the present invention utilizes the F cell 264$i$ illustrated in FIG. 4 within the $i$th row to calculate the sign extension SUM and GUARD signals for each intermediate sum generated by the B cells 200$i$, ..., 262$i$ within the $i$th row of array 120, $1<=i=<15$. Due to the two-bit-at-a-time variant of the Booth method used within the multiplier array 120 of the present invention, only the two sign extension signals need be retained for each intermediate sum. The F cell 264$i$ of the instant invention provides the capability of retaining only this minimal amount of sign extension bit information without retaining all the extraneous sign extension bits forming the bit positions to their left. In this manner, the compact multiplier array 120 can efficiently generate the intermediate products by providing just enough storage.

The design of the novel F cell 264$i$ illustrated in FIG. 4 affords the compact multiplier array 120 of the present invention by recognizing that the potential overflow of an intermediate sum can be managed in suitably modifying the design of the B cell, and incorporating therein a suitably redesigned second B cell. The carry in (C_IN) signal to the F cell is established at a level corresponding to a binary ZERO and circuitry corresponding to a first B cell sums $X_j-1$ and SIGN_IN with a carry in of ZERO. This is reflected in the design shown in FIG. 4 by setting the signal at one input of EXOR gate 564 to a level corresponding to ZERO, and by removing from the circuitry generating the carry out (C_OUT) the circuitry which is unnecessary by virtue of the C_IN signal being ZERO. Circuitry corresponding to a second B cell sums the SIGN_IN and $X_j$ signals.

The operation of the multiplier array 120 of the instant invention is perhaps best understood by reference to the following example in which the size of the two's complement multiplicand and multiplier words are reduced from 32 bits to eight bits, to facilitate the description.

| Line | Example I |
|---|---|
| 1 | 10110100 |
| 2 | *01010101 |
| 3 | 11110110100 |
| 4 | 0000010101 |
| 5 | 0010010110 |
| 6 | 11101011001 |
| 7 | 0010010110 |
| 8 | 001001011 |
| 9 | 111110101100 |
| 10 | 00010010110 |
| 11 | 001001011 |
| 12 | 1111001101100 |
| 13 | 000110010110 |
| 14 | 110110100 |
| 15 | 1110011011000010 |

The two's complement binary representation of a multiplicand equal to −76 is on the first line of the example. The binary representation of a multiplier equal to +85 is on the second line. The multiplicand, with the sign bit extended through the three next-most significant positions, is shown on line three of the example. Sign extension is performed by the F cell 264$a$. On line four are the inserted add/subtract bits which are generated by the Booth Encoders 266$a$, ..., 266$p$ and included in the summations performed by the B cells 200$a$, 204$a$, ..., 262$a$ in the first row of array 120. This quantity is sign-extended through the two next-most significant positions. The values of $Y-1$, $Y0$, and $Y1$, are 0, 1, 0, respectively, and in accordance with Table I, the operation of $-2X$ is performed on the multiplicand X. The Booth Encoder 266$a$ generates the M2 signal as a HIGH, and the multiplexers 530 of the B cells in the second row accordingly select the left-shifted X, operands as do the multiplexers 550 and 552 of the F cell 264$b$ in the second row. The sixth and seventh lines represents the sum and carry bits resulting from summing lines three, four, and five. These "carry-save" operations are performed by the F cell and the B cells in the second row of array 120, and the resulting sum and carry signals represent the first intermediate sum and carry.

Line eight represents the $-1X$ operation performed by the B and F cells in the third row of array 120 as selected by the M1 HIGH signal generated by Booth Encoder cell 266$c$. A second intermediate sum and carry is generated by these B and F cells 200$c$, ..., 264$c$ as is shown on lines nine and ten of the example. Another $-1X$ operation and a third intermediate sum and carry is shown on lines eleven, twelve and thirteen of the example. These operations are performed by the B and F cells 200$d$, ..., 264$d$ as directed by the Booth Encoder cell 266$d$ in the fourth row of array 120.

Line fourteen shows the results of a $+1X$ operation performed by the F and B cells 200$e$, ..., 264$e$ of the fifth row of array 120 as selected by the Booth Encoder cell 266$e$. Line fifteen of the example is the complete 16-bit product of the multiplicand ($-76$) and the multiplier ($+85$). It is the two's complement binary representation of $-6460$. As mentioned above, this product is formed in registers external to the multiplier array 120.

We claim:

1. A multiplier array responsive to an external clock signal which cyclically processes a plural-bit multiplicand word and a plural-bit multiplier word and cyclically generates therefrom a plural-bit product word, said multiplier array comprising a plurality of first combining means and a plurality of second combining means;

said plurality of first combining means arranged into m rows and n columns each responsive to predetermined bit positions of said multiplicand word and predetermined bit positions of said multiplicand word for arithmetically combining selected ones of said predetermined multiplicand bits with a sum and a carry signal generated by predetermined ones of said first combining means within a next-preceding row and with a sum and a guard signal generated by predetermined ones of said second combining means within said next-preceding row and for generating therefrom a sum and a carry signal, said first combining means within a row generating thereby a first portion of an "intermediate sum and carry" word; and said plurality of second combining means arranged in a column of m rows each responsive to predetermined bit positions comprising a most-significant portion of said multiplicand word and predetermined bit positions of said multiplier word for arithmetically combining selected ones of said predetermined multiplicand bits with a sign signal generated by predetermined ones of said second combining means within a next-preceding row for generating therefrom said sum, guard, and sign signals, each said second combining means generating thereby a second portion of said intermediate sum and carry word, said product word formed from predetermined portions of said intermediate sum and carry words.

2. A multiplier array according to claim 1 wherein each of said second combining means is responsive to the two most-significant bit positions of said multiplicand word.

3. A multiplier array according to claim 2, wherein said second combining means comprises a first arithmetic logic unit means responsive to said two most-significant multiplicand bit positions and to said sign signal generated by said second combining means in the preceding row (SIGN_IN) for generating said sum, and a second arithmetic logic unit means responsive to said most-significant multiplicand bit position and to said SIGN_IN signal for generating said guard and sign signals.

4. A multiplier array according to claim 1 further including a plurality of logic means arranged in a column each responsive to predetermined bit positions of said multiplier word for generating therefrom a plurality of control signals, wherein predetermined ones of said first and second combining means are connected to a predetermined one of said logic means and wherein said selection by said first and second combining means of ones of said predetermined multiplicand bits is caused by said control signals.

5. A multiplier array according to claim 4 wherein n=2m, wherein said second combining means comprises:
first arithmetic logic unit means responsive to said two most-significant multiplicand bit positions and to said sign signal generated by said second combining means in the preceding row (SIGN_IN) for generating said sum, and a second arithmetic logic unit means responsive to said most-significant multiplicand bit position and to said SIGN_IN signal for generating said guard and sign signals.

6. A multiplier array according to claim 5 wherein said first arithmetic logic unit includes first gate means responsive to said SIGN_IN signal and a second signal for generating said sum signal, and first multiplexer means receiving signals representative of said two most-significant multiplicand bit positions and a signal corresponding to binary ZERO, responsive to said plurality of control signals for selectively conducting one of said signals representative of said most-significant multiplicand bit positions, or one of said signals representative of the complement of said most-significant multiplicand bit positions, or said signal corresponding to ZERO, being said second signal, to said first gate means.

7. A multiplier array according to claim 6 wherein said second arithmetic logic unit includes second gating means responsive to said SIGN_IN signal, to said signal selectively conducted by said first multiplexer means, and to a third signal for generating said guard and sign signals, and second multiplexer means receiving a signal representative of said most-significant multiplicand bit position and a signal corresponding to binary ZERO, responsive to said plurality of control signals for selectively conducting said signal representative of said most-significant multiplicand bit position, or a signal representative of the complement of said most-significant multiplicand bit position, or said signal corresponding to ZERO, being said third signal, to said second gating means.

8. A multiplier array responsive to an external clock signal which cyclically processes a plural-bit multiplicand word and a plural-bit multiplier word and cyclically generates therefrom a sequence of plural-bit intermediate sum and carry words, each row of said array comprising:
first combining means responsive to said multiplicand word, predetermined bit positions of said multiplier word and signals representative of a next-preceding "intermediate sum and carry word" for generating a first portion of a current "intermediate sum and carry" word; and
second combining means responsive to predetermined bit positions comprising a most-significant portion of said multiplicand word and to predetermined bit positions of said multiplier word and a signal representative of a "sign" signal generated by said second combining means in the next-preceding row for generating a second portion of said current intermediate sum and carry word.

9. A multiplier array according to claim 8 wherein each row further includes logic means responsive to said predetermined bit positions of said multiplier word for generating therefrom a plurality of control signals, and wherein said first and second combining means within said row generate each bit position of said first, said second, portion, respectively, of said intermediate sum and carry word from selected ones of said multiplicand bit positions in response to said control signals.

10. A multiplier array according to claim 9 wherein said second combining means is responsive to the two most-significant bit positions of said multiplicand word and wherein said second combining means comprises:
first arithmetic logic unit means responsive to said two most-significant multiplicand bit positions and to said sign signal generated by said second combining means in the preceding row (SIGN_IN) for generating said sum signal; and
second arithmetic logic unit means responsive to said most-significant multiplicand bit position and to said SIGN_IN signal for generating said guard and sign signals.

11. A multiplier array according to claim 10 wherein said first arithmetic logic unit includes first gate means responsive to said SIGN_IN signal and a second signal for generating said sum signal, and first multiplexer means receiving signals representative of said two most-significant multiplicand bit positions and a signal corresponding to binary ZERO, responsive to said plurality of control signals for selectively conducting one of said signals representative of said most-significant multiplicand bit positions, or one of said signals representative of the complement of said most-significant multiplicand bit positions, or said signal corresponding to ZERO, being said second signal, to said first gate means.

12. A multiplier array according to claim 11 wherein said second arithmetic logic unit includes second gating means responsive to said SIGN_IN signal, to said signal selectively conducted by said first multiplexer means, and to a third signal for generating said guard and sign signals, and second multiplexer means receiving a signal representative of said most-significant multiplicand bit position and a signal corresponding to binary ZERO, responsive to said plurality of control signals for selectively conducting said signal representative of said most-significant multiplicand bit position, or a signal representative of the complement of said most-significant multiplicand bit position, or said signal corresponding to ZERO, being said third signal, to said second gating means.

* * * * *